(12) United States Patent
Cabos

(10) Patent No.: US 8,811,616 B2
(45) Date of Patent: Aug. 19, 2014

(54) SECURE AIRCRAFT DATA CHANNEL COMMUNICATION FOR AIRCRAFT OPERATIONS

(75) Inventor: Ralf Cabos, Singapore (SG)

(73) Assignee: Flight Focus Pte. Ltd., Singapore (SG)

( * ) Notice: Subject to any disclaimer, the term of this patent is extended or adjusted under 35 U.S.C. 154(b) by 118 days.

(21) Appl. No.: 13/084,576

(22) Filed: Apr. 12, 2011

(65) Prior Publication Data

US 2012/0177198 A1    Jul. 12, 2012

(30) Foreign Application Priority Data

Apr. 12, 2010 (WO) .................. PCT/IB2010/051553

(51) Int. Cl.
*H04L 29/06* (2006.01)

(52) U.S. Cl.
USPC ......................................................... 380/270

(58) Field of Classification Search
CPC .................................................. H04L 2209/84
USPC ......................................... 380/270, 271, 277
See application file for complete search history.

(56) References Cited

U.S. PATENT DOCUMENTS

| | | | |
|---|---|---|---|
| 3,657,476 A | 4/1972 | Aiken | |
| 4,405,829 A | 9/1983 | Rivest et al. | |
| 6,816,762 B2 | 11/2004 | Hensey et al. | |
| 7,020,708 B2 | 3/2006 | Nelson et al. | |
| 7,630,710 B2 | 12/2009 | Kauffman | |
| 2003/0027550 A1 | 2/2003 | Rockwell | |
| 2003/0068044 A1* | 4/2003 | Nikolsky | ...................... 380/258 |
| 2006/0008087 A1* | 1/2006 | Olive | ............................ 380/255 |
| 2007/0021117 A1 | 1/2007 | McKenna et al. | |
| 2007/0028089 A1 | 2/2007 | Yukawa et al. | |

(Continued)

FOREIGN PATENT DOCUMENTS

| | | |
|---|---|---|
| WO | 2011128832 | 10/2011 |
| WO | 2011128833 | 10/2011 |

OTHER PUBLICATIONS

Cabos; International Search Report and Written Opinion for serial No. PCT/IB11/051555, filed Apr. 12, 2011, mailed Feb. 6, 2012; 16 pgs.

(Continued)

*Primary Examiner* — Jason Gee
(74) *Attorney, Agent, or Firm* — Taylor English Duma LLP

(57) ABSTRACT

According to the application, a method for transmitting an encrypted aircraft related message is disclosed. A message is provided at one of a ground computer system or an aircraft computer system. The aircraft related message is arranged into data packets and at least one of the data packets is encrypted with an encryption key to obtain at least one encrypted data packet. The at least one encrypted data packet is transmitted from a sender to a recipient, wherein the sender is one of the ground computer system or the aircraft computer system, the recipient is the other one of the ground computer system or the aircraft computer system. The at least one encrypted data packet is received by a computer system of the recipient. A step of deciding whether the message is intended for the recipient's computer system is provided. The step of deciding comprises an attempt to decrypt the at least one encrypted data packet with an decryption key, and the decryption attempt comprises analyzing of the message content. If it is decided that the decryption that the message is intended for the recipient, a step of processing the decrypted data message by the recipient's computer system is provided.

4 Claims, 8 Drawing Sheets

(56) References Cited

U.S. PATENT DOCUMENTS

Figure 1:
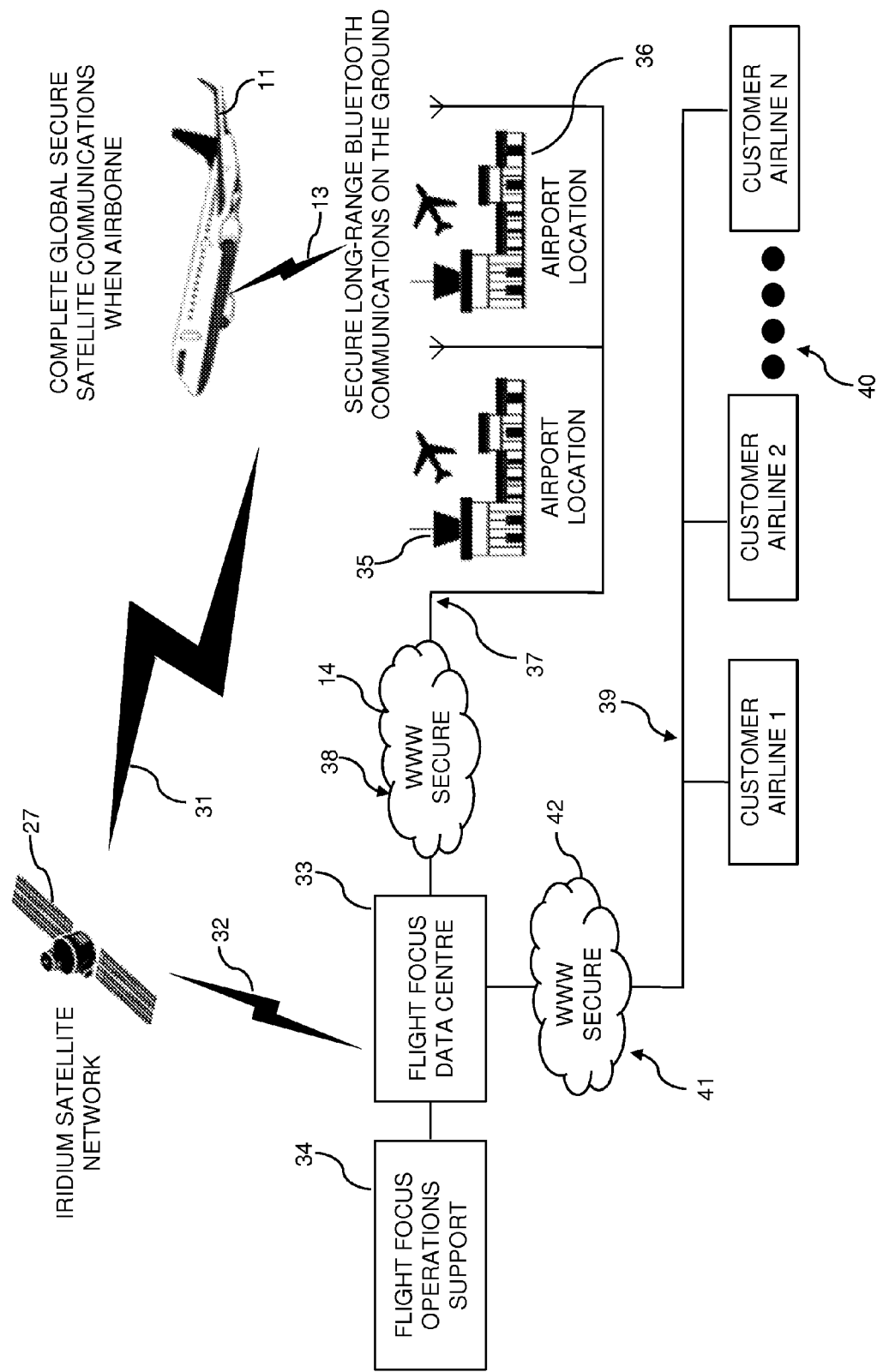

| | | | |
|---|---|---|---|
| 2007/0214583 A1* | 9/2007 | Hutton | 14/71.5 |
| 2008/0102824 A1 | 5/2008 | Kauffman | |
| 2008/0182573 A1 | 7/2008 | Lauer et al. | |
| 2008/0214188 A1 | 9/2008 | Galy et al. | |
| 2008/0305762 A1 | 12/2008 | Malosh | |
| 2009/0285153 A1 | 11/2009 | Khan et al. | |

OTHER PUBLICATIONS

Cabos; International Search Report and Written Opinion for serial No. PCT/IB2011/051556, filed Apr. 12, 2011, mailed Feb. 6, 2012; 3 pages.

Cabos; U.S. Patent Application entitled: Use of a Meta Language for Processing of Aviation Related Messages having U.S. Appl. No. 13/640,702, filed Oct. 11, 2012, 108 pgs.

Cabos; U.S. Patent Application entitled: SMS Communication to and From Messaging Devices in an Aircraft having U.S. Appl. No. 13/640,705, filed Oct. 11, 2012, 33 pgs.

Cabos; International Preliminary Report on Patentability for serial No. PCT/IB2011/051555, filed Apr. 12, 2011, mailed Oct. 23, 2012, 66 pgs.

Cabos; International Preliminary Report on Patentability for serial No. PCT/IB2011/051556, filed Apr. 12, 2011, mailed Oct. 23, 2012; 26 pgs.

* cited by examiner

SECURE AIRCRAFT DATA CHANNEL COMMUNICATION FOR AIRCRAFT OPERATIONS

During a typical passenger flight, information from various sources must be managed by the flight crew. A large part of the information required for a flight is carried in a paper hardcopy form in a pilot's Flight Bag, which is typically a heavy document bag that pilots carry to the cockpit. The progress in information technology has enabled the carriage of these documents in an electronic format which is more commonly referred to as electronic flight bag (EFB).

An Electronic Flight Bag (EFB) is an electronic information management device that helps flight crews carry out flight management tasks more easily and far more efficiently with less paper. An EFB is a general purpose computing platform intended to reduce, or replace, paper-based reference material often found in the Pilot's carry-on Flight Bag, including Aircraft Operating Manuals, Flight Crew Operating Manual, Route Manuals including navigational charts and a range of other documents and manuals required for the flight. The type and content of each of these manuals can vary according to the type of aircraft being used and the routes on which the aircraft operate.

In addition, the EFB can host purpose-built software applications to automate other functions normally conducted by hand, such as performance take-off calculations or by other agencies such as for flight planning.

Furthermore, there exist solutions which enhance or complement the functionality of an electronic flight bag by providing data exchange via satellite communication, for example in order to provide updated meteorological data to the flight crew or for delivering an overview of the position of all aircraft to a control centre of an airline.

In the majority of cases, an airline has a "Back Office" organisation, which is responsible for updating Route Manuals, and other manuals or documents carried by a flight crew, and for the general preparation of documents and planning material required by a flight crew during the progress of a flight.

According to the application, a method for transmitting an encrypted aircraft related message is disclosed, especially for transmitting the message from a ground station to an aircraft or to multiple aircraft, but also from an aircraft to other aircraft or to one or more ground stations. These different alternatives are also referred to as "transmitting from one of a ground computer system or an aircraft computer system to the other of the ground computer system to the aircraft computer system". For transmitting between one ground computer system and another ground computer system, other protocols can be used, e.g. TCP/IP.

According to the application, an aircraft related message is provided at a ground computer system or, alternatively, at an aircraft computer system. The aircraft related message is arranged into data packets. Advantageously, the size of one data packets corresponds to a typical packet size of a transmitting means, especially a transmitting means for a short burst data service. At least one of the data packets is encrypted with an encryption key and transmitted via a transmitter. In the case of using a short burst data service, the size of a data packet is at most the size of a data packet of a short burst data service and the transmitting comprises deriving a transmitter data burst of the short burst data service from the encrypted data packet and transmitting the transmitter data burst. Furthermore, according to a specific embodiment, the at least one encrypted data packet is transmitted to a satellite of a global satellite network.

The at least one encrypted data packet is received via an antenna by a computer system on the aircraft or on the ground, respectively and the encrypted data blocks are reassembled to obtain an encrypted data message. According to the application, a decision step is taken, to decide whether the message is intended for the recipient, which is the ground computer system or the aircraft computer system, respectively. The decision step comprises an attempt to decrypt the at least one encrypted data packet with a decryption key. To ascertain whether the decryption attempt was successful, the message content is analyzed, for example the message is parsed and the validity of the data is determined based on addresses, MAC-identifiers or other identifiers, combination identifiers for indicating a combination of recipients, pre-determined key words such as standard headers, computing a checksum or message digest, or based on the correctness of the sentence structure.

If it is determined that the message is intended for the recipient, which is the ground based computer system or the aircraft based computer system, respectively, the encrypted data message is decrypted with a decryption key to obtain a decrypted data message and further processed, such as by storing the decrypted data message in a database of one of the ground computer system or the aircraft computer system.

Preferentially, the encryption key is either previously known to sender and recipient or included in the message to avoid unnecessary message traffic through key negotiation. Avoiding negotiation traffic is especially useful in the context of a pull service, for example short burst email systems such as Iridium SBS. The abovementioned method is different from a conventional PGP encryption. It does not use the recipients email address list to verify whether the message is intended for the aircraft or not. Here, the parser check on the decrypted package is used. This is advantageous because the message can be kept shorter, especially if there are many recipients. The security is also higher as with the conventional PGP system because there is a plausibility check on the decrypted data.

The plausibility check is especially useful for transmission paths that already provide an address layer such as mobile phone type transmissions or Iridium Short Burst Message services. Once the communication is established, the data transmission is often done on the basis that the sender and receiver do not change their identities during their further communication. The application provides redundancy by an extra level of security especially for these communication types by making sure that the message is only processed by the intended recipient. This can be crucial in the case that data is transmitted to the aircraft that influences its fuel burning rate.

In a special embodiment, the message is immediately discarded if it is decided that the message is not intended for the recipient, especially for the aircraft based system. This saves time and does not distract the pilots or other personnel involved. The airborne system can also distinguish between a message that has been detected to not be intended for the aircraft based system from messages that may be relevant for the aircraft based system but that are otherwise not usable and react accordingly. For example, in the case that the airborne transmission system detects that a message was corrupted on the transmission path, for example by comparison of a computed checksum with a checksum included in the message, the aircraft may request the ground base system to retransmit the message.

The application can be used both with symmetric encryption/decryption, which uses the same key for encryption and decryption, and with asymmetric symmetric encryption/decryption which uses different keys for encryption and decryption. Symmetric encryption/decryption is in general relatively faster as compared with asymmetric encryption/decryption because asymmetric encryption/decryption is often done with a more time consuming but safer private/public key method. A hybrid encryption/decryption which uses symmetric encryption of a message with an encryption key and an asymmetric encryption/decryption of the encryption key combines the fastness of symmetric encryption with the security of asymmetric encryption.

Different ways of encrypting the message are possible. The message may be encrypted with a symmetric or asymmetric encryption key. In the case that the message is encrypted with a symmetric encryption key, the encryption key itself may be encrypted with an asymmetric key encryption key or a symmetric key encryption key. The symmetric key may be provided by a predetermined key or, to avoid attacks via statistic analysis, the symmetric encryption key be may be derived from a random number. The asymmetric key may be derived according to a RSA method, a Diffie Hellman method, an identity based broadcast encryption method or others. Furthermore, the asymmetric key may be given by a group key that matches with private keys of a group of recipients. In this way, the inclusion of multiple key segments that are encrypted separately with the public keys of the recipients may be avoided and the overall message length can be kept shorter. Especially the identity based broadcast encryption allows an easy generation of such a group key.

According to another aspect of the present application, a method for transmitting an encrypted aircraft related message, especially to one or more aircraft, is disclosed. An aircraft related message is provided at one of a ground computer system or an aircraft computer system. The aircraft related message is arranged into data packets and at least one data packet is provided with a predetermined combination identifier which is characteristic for the intended recipient or recipients of the aircraft related message, such as an ID list, a bitmask, a position in a search tree, etc.

The at least one of the data packets is encrypted with an encryption key to obtain at least one encrypted data packet, wherein encrypting a data packet also comprises encrypting only part of the data packet with an encryption key. When using a short burst data service, the length of a data packet is at most as long as the length of a short burst data packet. The at least one encrypted data packet is transmitted from a sender, which is one of the ground computer system or the aircraft computer system to a recipient, which is the other one of the ground computer system or the aircraft computer system. The at least one encrypted data packet is received by the recipient's computer system via an antenna.

The recipient's computer system reassembles the encrypted data blocks to obtain an encrypted data message and inspects a combination identifier. Based on the combination identifier, it is detected if the aircraft related message is addressed to the recipient. If it is detected that the aircraft related message is addressed to the recipient, the encrypted data message is decrypted with a decryption key to obtain a decrypted data message and the decrypted data message is further processed, for example it is stored in a database of the aircraft computer system.

This aspect of the application provides very short messages, especially if there are messages that are regularly sent to the same multiplicity of aircrafts, such as in broadcasts to a part or to a whole of a fleet. Especially airlines do not often change their fleet to a great extent so that the number of recipients remains constant over long periods of time. This means that the combination identifier can be kept relatively short. As long as the length of the combination identifier is kept constant, a change of the individual combination identifier of an aircraft is only relevant for the transmitting ground base system and for the respective aircraft itself. This means that the boundary conditions of the transmission between sender and recipient remains constant.

The encryption/decryption is of an symmetric type, which is fast and reliable. This means that cheap and ultra-fast transmission paths such as broadband channels provided by geostationary TV satellites can be used for communicating with the airborne system. If, in a special embodiment, the message is immediately discarded if the message is not intended for the aircraft based system, one could then easily sort out data packets and messages that are intended for the airborne system. Despite discarding a large quantity of data packets or messages, the total transmission costs are still much lower as if the transmission was done over a directional transmission path. The distinction between relevant and non-relevant packets or messages is done with a fast and reliable symmetric decryption method.

The encryption can be done with an encryption key that is included into the message, even with the combination identifier. This is a very simple method that provides a minimum security standard. If the encryption is done with a key that is characteristic for the intended recipient but that has been exchanged at an earlier time, the security level of the encryption is higher.

In a further embodiment of the abovementioned method, a step of deciding whether the message is intended for the recipient's computer system, is provided. The step of deciding comprises an attempt to decrypt the at least one encrypted data packet with an encryption key. Based on the decryption attempt, it is determined if the message is intended for the recipient's computer system. Only if is determined that the message is intended for the recipient's computer system, the encrypted data message is decrypted with a decryption key to obtain a decrypted data message and the data message is further processed the decrypted data message by the recipient's computer system, for example it is stored in a database of the recipient's computer system.

In the case that, the airborne transmission system detects that a message was corrupted on the transmission path, for example by comparison computed checksum with a checksum included in the message, the aircraft may request the ground base system to retransmit the message. The airborne system can also distinguish between a message that has been detected to not be intended for the aircraft based system from messages that may be relevant for the aircraft based system but that are otherwise not usable and react accordingly.

Also this aspect of the invention maintains an extra redundancy which is useful for transmission paths that already provide an address layer such as mobile phone type transmissions or Iridium Short Burst Message services.

According to a further aspect of the abovementioned method the encryption key is provided by the combination identifier and, in the encryption step, at least part of the bits of the data packet are XOR-ed with the encryption key to obtain an encrypted data block. According to yet another aspect, the encryption key is derived from the combination identifier, for example by using the combination identifier as a key seed or by using the combination identifier to select a predetermined encryption key. Especially, the combination identifier may be used to select a shared key from a lookup table. These alternatives provide a compromise between the simplicity of using the combination identifier for encryption and encryption security.

Furthermore, the application discloses a wireless transmitter for transmitting an encrypted aircraft related message from a sender to one or more recipients according to one of the abovementioned methods, especially via a satellite communication connection. The wireless transmitter comprises a database, a message creation means for deriving the aircraft related message from the database content, a message encryption means for encrypting at least one data packet of the aircraft related message with an encryption key, a data and information processing and synchronisation device and a ground based communications device for transmitting the at least one data packet.

Moreover, the application discloses a wireless receiver for receiving an encrypted aircraft related message from a sender according to one of the abovementioned methods, especially via a satellite communication connection. The wireless receiver comprises a recipient computer system which in turn comprises a data and information processing and synchronisation device, a decryption means for decrypting data packets of the aircraft related message with a decryption key, and a processing means for processing an output of the decryption means. According to a first embodiment, the wireless receiver comprises furthermore an analyzing means for analyzing a message content and a decision means for deciding, based on an output of the analyzing means, whether the message is intended for the recipient computer system. According to a second embodiment, the wireless receiver furthermore comprises an inspection means for inspecting a combination identifier which is included in at least one data packet of the aircraft related message and a detection means for detecting, based on the combination identifier, if the aircraft related message is addressed to the recipient. The combination identifier defines a list of recipients of the aircraft related message. The application also discloses an aircraft with a wireless receiver according to the application and with a wireless sender according to the application.

In the context of the application, a "wireless data transmission" is understood in the general sense of a data transmission without the use of a data transmission cable. This includes the use of a USB-Stick or of a portable data carrier.

According to a further aspect of the application, aviation data and information is received by a ground-based computer system, is processed in accordance with the requirements of individual aircraft types and routes flown after which data and information is passed to the aircraft concerned using secure communications connections. In a processing stage, a message is compiled from the data at a ground computer system. The data is derived from an analysis of the new data and information when compared to the data and information, which exists onboard the aircraft. The comparison is done by reference to Master Document Lists or other content inventory lists that show the data and information held by the aircraft-based system and by the ground-based system. The message is encrypted with an encryption key of an aircraft computer system. The message is then transmitted from the ground-based computer system to the aircraft-based computer system, where the encrypted message is decrypted with a decryption key of the aircraft computer system. The encryption key and the decryption key form a corresponding characteristic encryption key pair of the aircraft computer system, so that only those encrypted messages which have been encrypted with the correct corresponding first key data object will be successfully decrypted. Upon a successful decryption, the message is provided to the aircraft-based computer system for use in the computer applications onboard the aircraft and for retention and storage in the onboard database.

This method may be used for secure data transmission from the ground-based computer system to the aircraft-based computer system. Use of a key-based system ensures that only the information meant for a specific flight is able to be decrypted and used by the correct aircraft, thus preventing incorrect data and information from being sent to an aircraft and so enhancing aviation safety.

Use of key encryption forms the basis of the relationship between the master document lists and other content inventory lists held on the ground-based computer system and the master document list and other content inventory lists held on the aircraft. Synchronisation between the ground-based system and the aircraft-based system ensures the aircraft-based system is kept current.

According to a further aspect of the application, a message is compiled by an aircraft-based computer system. The message is then encrypted with an encryption key of a ground computer system and the encrypted data object is transmitted from the aircraft-based computer system to the ground-based computer system. Upon reception, the encrypted message is decrypted with a decryption key of the ground computer system. The encryption key and the decryption key form a corresponding characteristic encryption key pair of the ground computer system, such that only those encrypted data objects which have been encrypted, with the correct corresponding encryption key will be successfully decrypted. Upon a successful decryption, the data object is stored in a database of the ground computer system for further use when required.

This method may be used for data transmission from the aircraft-based system to the ground-based computer system, for use in transmitting data such as an operational flight plan (OFP), a fuel order to a ground-handling agent, defects list of the aircraft, an en-route pilot report, authorisation of information in the cockpit, or even SMS and email messages.

Figure 2:
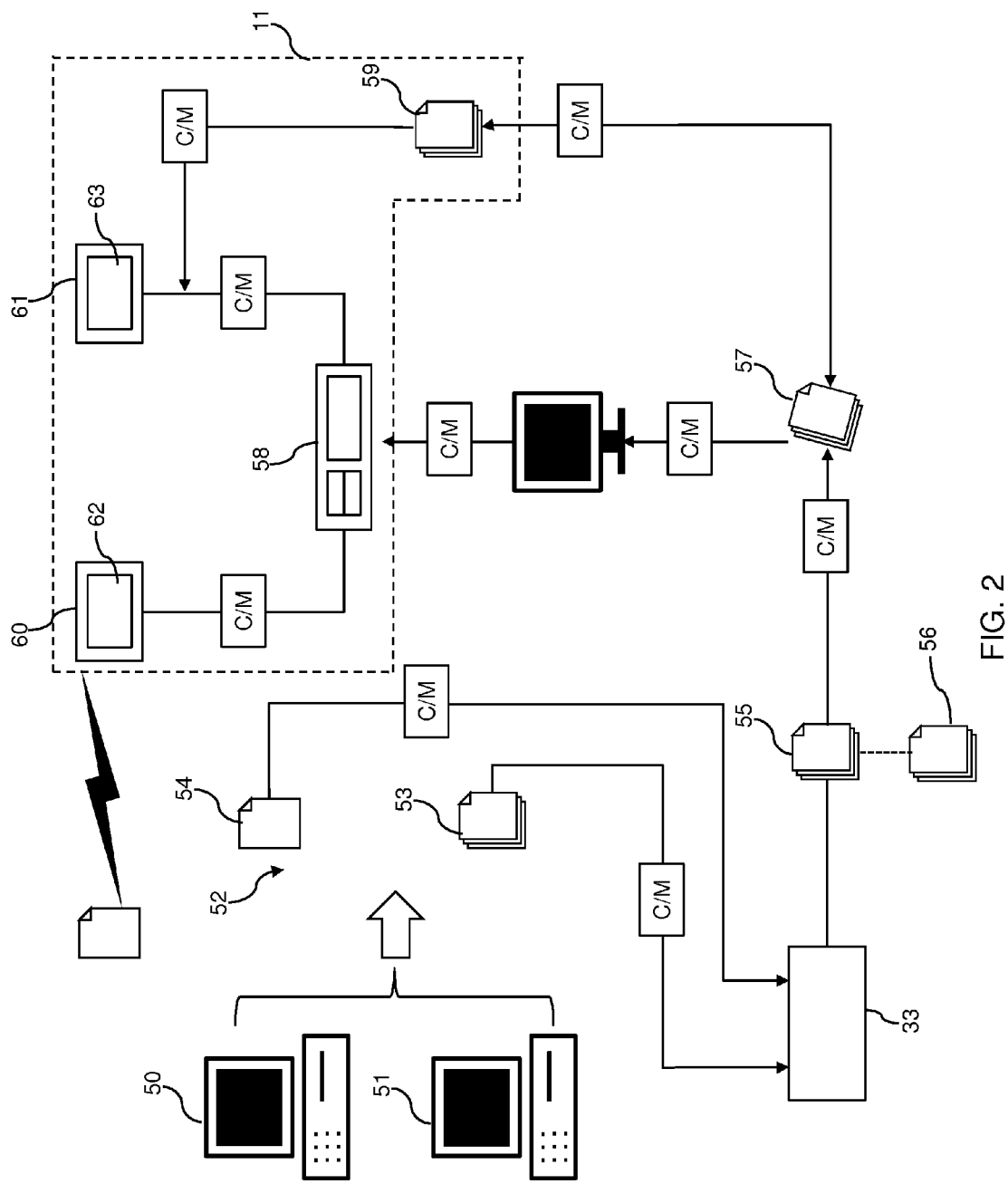
Figure 3:
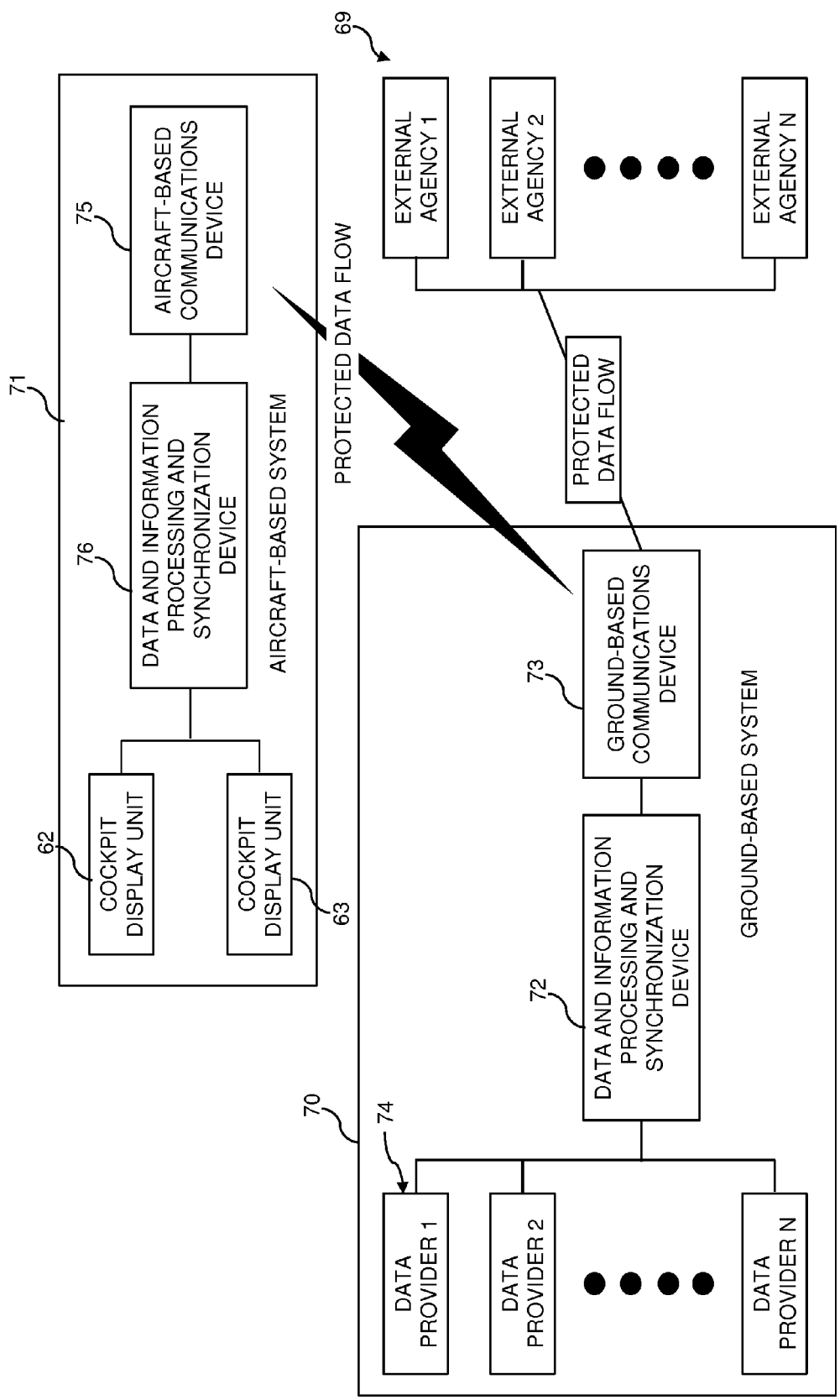
Figure 4:
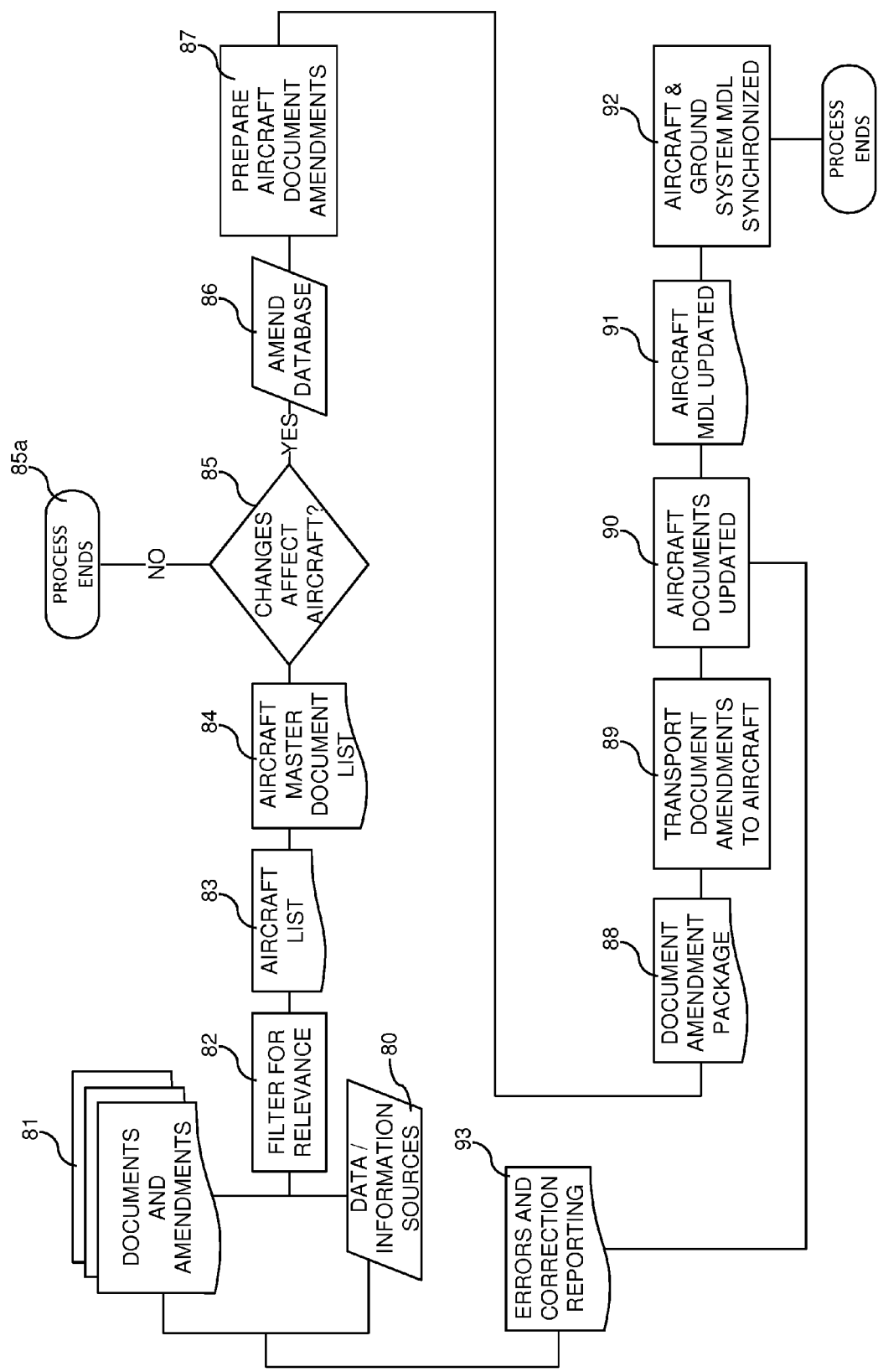
Figure 5:
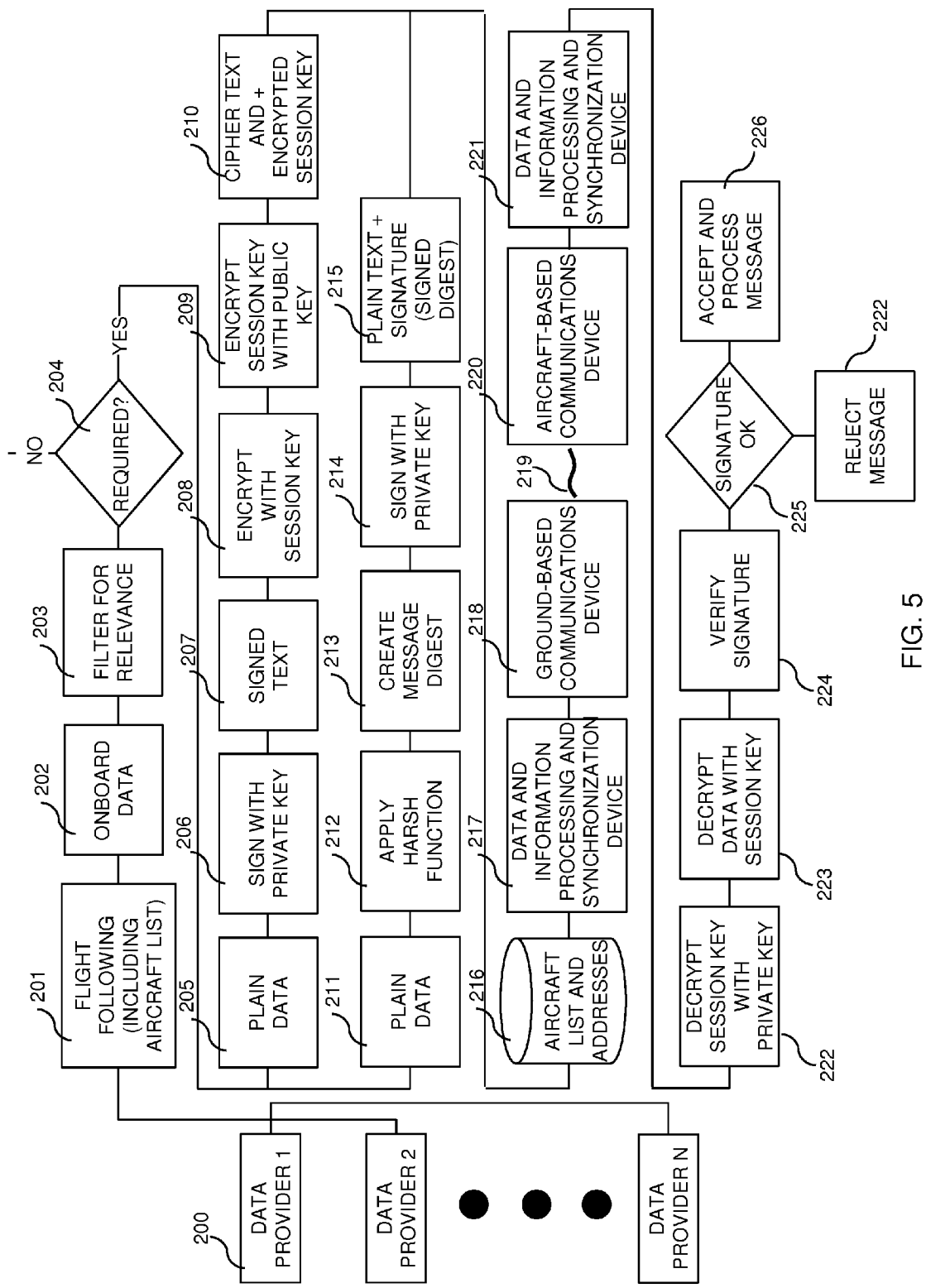
Figure 6:
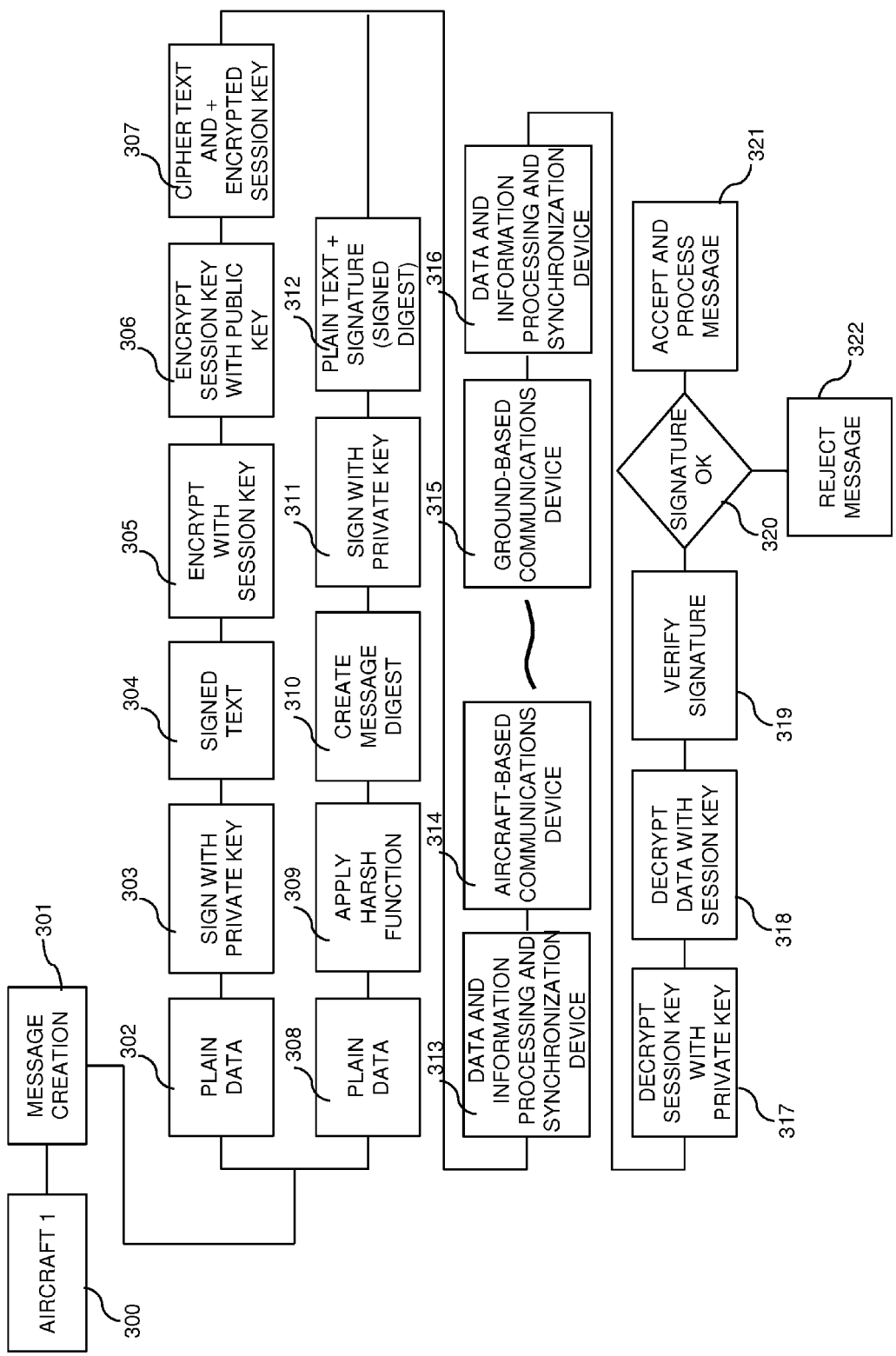
Figure 7:
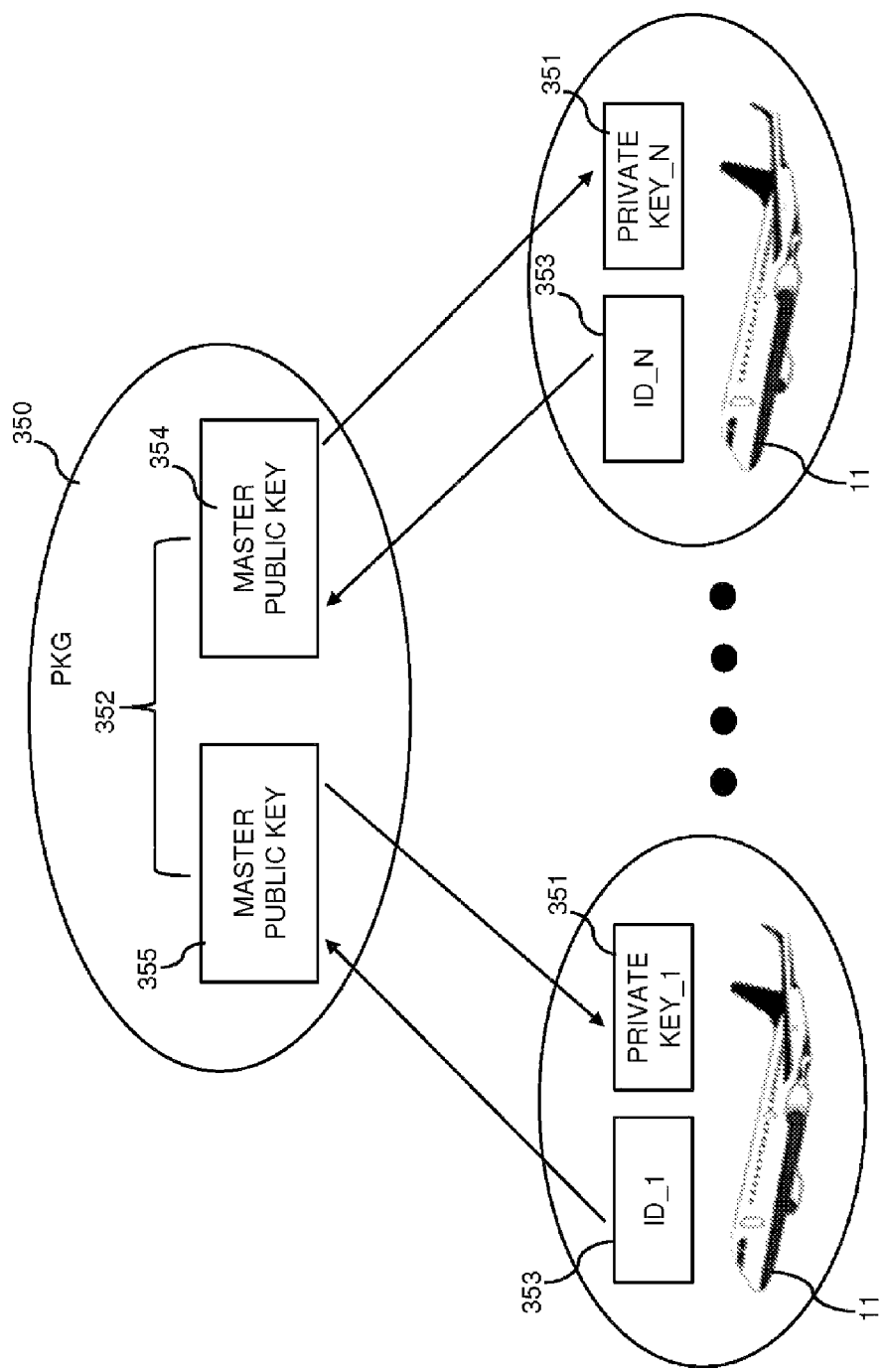
Figure 8:
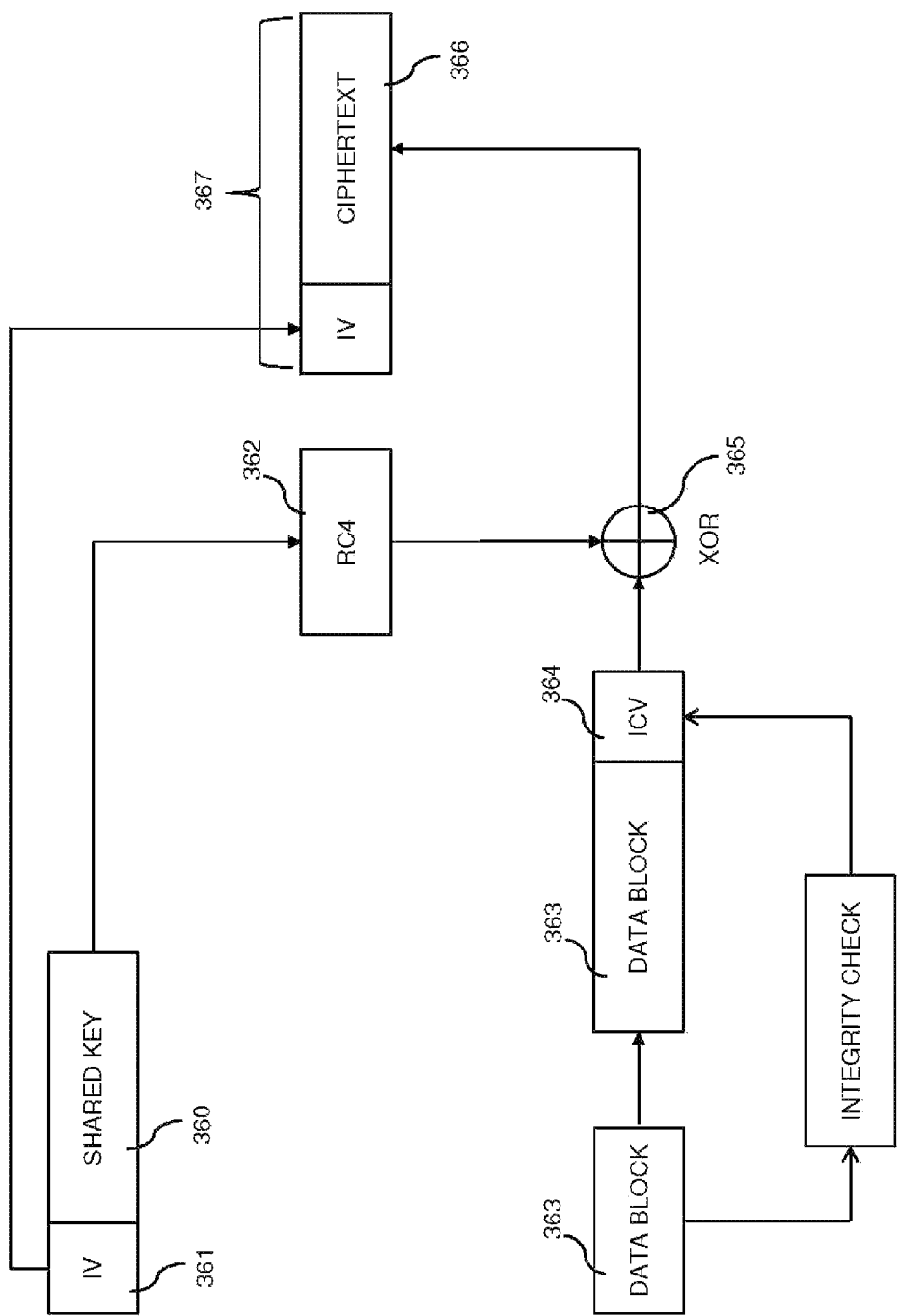

The embodiments of the present application are further explained with reference to the following figures in which FIG. 1 shows an operational diagram of the flight information system, FIG. 2 shows a diagram of a data synchronization process of onboard data, FIG. 3 illustrates the data flow between a ground-based system, external agencies and an aircraft-based system, FIG. 4 illustrate an update of onboard data of an aircraft, FIG. 5 illustrates processing of ingoing encrypted messages to an aircraft-based system, and FIG. 6 illustrates processing of outgoing encrypted messages from an aircraft-based system, FIG. 7 illustrates a further encryption method using identity based encryption, and FIG. 8 illustrates a further encryption method using shared keys.

In the following description, details are provided to describe the embodiments of the application (invention). It shall be apparent to one skilled in the art, however, that the embodiments may be practised without such details.

FIG. 1 shows an operational diagram of a flight information system 10.

Airborne components of the flight information system are provided on an aircraft 11. The airborne components include two pilot terminal units, a main computer and means for communication and data exchange. The pilot terminal units each comprise a touch screen and a content inventory. On board applications and data are stored on computer readable media in the pilot terminal units. The on board applications and data provide the flight crew with the facilities to carry, read and search electronic documents, manuals and charts and to enable the flight crew to perform various functions such as the generation and transmission of en-route reports, generation of crew briefing packages, generation and signing of load sheets and loading instructions, and the generation of flight plans. Those onboard applications of the flight information system 10 that perform tasks of an airline back office are hereafter also referred to as airborne airline back office (A2BOS).

A service provider's data centre 33 is connected to an operations support centre 34. Airport communication channels 37 are provided between the service provider's data centre 33 and airports 35, 36. The airport communication channels 37 comprise a first secure connection 38 via a first data network 14. Airline communication channels 39 are provided between the service provider's data centre 33 and airline offices 40. The airline communication channels 39 comprise a second secure connection 41 via a second data network 42.

Furthermore, a Bluetooth communication channel 13 is provided between a transmitter at an airport 35, 36 and the aircraft 11. The Bluetooth communication channel 13 serves to connect the aircraft 11 to the service provider's data centre 33 via the airport communication channel 37 while the aircraft 11 is on ground.

FIG. 2 shows a diagram of a data synchronization process of onboard data via a communication channel between the aircraft 11 and the service provider's data centre 33.

For a data transfer to the aircraft 11 via the Bluetooth communication channel 13, a data processing unit at the service provider's data centre 33 receives aeronautical data from external data sources 50, 51. The aeronautical data includes, among others, route manuals, maps and charts, and other data amendments 53, or amendments to published information which are notified by NOTAM. In a filtering step, the data processing unit compares the received data to a stored previous version of the data, identifies the modifications, and changes to the data. A data list 55 contains a list of aircraft data and is kept in a database. Each aircraft data entry contains a corresponding reference to a master document list 56 for that aircraft 11. The master document list 56, in turn, contains entries in the form of a master list of all of the contents of all of the documents and other data held onboard the corresponding aircraft 11. In a storing step, the received and filtered data is used to update the master documents and the content inventory of the master document list 56.

In a data processing step, the data for a specified aircraft 11 is collected from the master document list 56. If a previous version of the data exists on the aircraft 11 and the previous version also exists in the database, changes and modifications are identified and an aircraft data amendment package 57 is generated which contains the changes and amendments. If there is no previous data held by the ground-based system and new information has been received which is required to be held on the aircraft-based system, the ground-based master document list is changed in response to directions from the customer or the service provider and a data package containing new and amended data is created. An example of this step is when an aircraft 11 is scheduled to fly on different routes to those flown previously, the new route information is added to the master document list and the new route information is compiled for distribution to the aircraft 11. A further example is in the case that a new document is received by the ground-based system that is required to be carried onboard the aircraft 11. The master document list in the ground-based system is updated on direction from the service provider or airline, the document and its contents included into the master document list, and included into the data package to be delivered to the aircraft-based system.

The data package or the data amendment package is compressed and encrypted via public key encryption. The encryption uses a public key, which is unique to each aircraft 11 for which data is kept in the database. A corresponding private key is stored in a data storage medium onboard the aircraft 11.

In a transfer step, the data package or data amendment package 57 is transferred to the plane via the Bluetooth communication link or via a portable storage medium, such as a USB device.

In a receiving step, an aircraft-based computer system 11 receives the data via a dedicated antenna or via the portable storage medium. The aircraft-based computer system decrypts the data with the private key of the aircraft 11. If the attempt fails, the data transfer is aborted and an error message is generated. If the data was transferred via the Bluetooth communication channel 13, the error message is sent back to the service provider's data centre via the Bluetooth communication channel 13.

The aircraft-based system uses the received data to identify changes and modifications relative to onboard master documents of an onboard master document list 59 in a storage medium of the aircraft-based system. The aircraft-based system examines the changes and modifications, to update the onboard master document list and content inventories in the cockpit display units 62 and 63.

Upon completion of the update of the onboard master document list 59 or at an appropriate later time, the aircraft-based system 11 synchronises the master document and content inventory held on the aircraft 11 and sends a confirming list of the changes and modifications to the onboard master documents 59 back to the service provider's data centre 33. A data processing unit at the service provider's data centres 33 checks that the data onboard the aircraft-based system has been correctly updated by crosschecking with the master document list held on the ground-based system and keeps a record of all of the changes that have been applied.

FIG. 3 shows a data flow diagram illustrating the data flow between a ground-based system 70, for example the service provider's data centre 33, and external agencies 69 and between the ground-based system 70 and an aircraft-based system 71.

The ground-based system 70 comprises a data information processing and synchronization unit 72 for processing and synchronizing the data from various data providers 74 and other data provided by external agencies 69. Furthermore, one or more ground-based communications devices 73 are provided in the ground-based system 70 to receive and transmit data and information from data providers 74 and external agencies 69 and secondly to transmit an encrypted data flow to and from an aircraft-based system onboard the aircraft. The communications device may be realized in different ways, for example as a receiver and transmitter or as a connection device to a data network.

Similarly, the aircraft-based system 71 comprises one or more aircraft-based communications devices 75 and a data and information processing and synchronization device 76. The data and information processing and synchronization device of FIG. 3 corresponds to the onboard processing units in the cockpit display units 62 and 63.

In a further example of the data and information collection and compilation activities shown in FIG. 3, NOTAM are received from data providers 74, and are processed for relevance in relation to specific aircraft 11 or to specific routes flown by the airline. In a compilation step after the receipt of NOTAM, the ground-based system automatically compiles a Monthly AIRAC NOTAM Bulletin, which, for the purposes of this embodiment, is a collection of long term or permanent NOTAM that generally have a lesser importance when compared to some other NOTAM received by the ground-based system. For example a long term NOTAM notifying a change to the radio call sign of an air traffic facility would generally have lesser importance when compared to one notifying a runway or a taxiway being unserviceable.

Compilation of the Monthly AIRAC NOTAM Bulletin by the ground-based system is part of the data and information filtering process, and one that is closely aligned to the processes depicted in FIG. 4 which depict a further view of the collection, collation and construction of a mission data sub-set.

The mission data sub-set makes reference to the Monthly AIRAC NOTAM Bulletin which has been compiled by the ground-based system and distributed to aircraft 11 for which the service provider has responsibility, and does not include those NOTAM included in the Monthly AIRAC Bulletin with the mission data sub-set as these have already been passed to the aircraft 11 in a separate document in the processes depicted in FIG. 4 for the updating of various aircraft documentation. Monthly AIRAC NOTAM Bulletin are provided to the aircraft 11 at a parameter time which is derived by the ground-based system by making reference to the published AIRAC date.

The overall effect of the Monthly AIRAC NOTAM Bulletin is to reduce the numbers of NOTAM forming part of the mission data sub-set and reducing the amount of detail of direct operational significance to be absorbed by the flight crew in a relatively short space of time before during flight preparation, and is therefore, a direct safety benefit to the operations of the airline.

FIG. 4 shows a workflow diagram relating to the receipt of documents and amendments and is related to the depiction in FIG. 2. In a collection step, documents and amendments 81 are compiled from various data and information sources 80. In a filtering step 82, the documents and amendments are examined for relevance using aircraft list 83 which is a list of all aircraft 11 for which a service provider holds responsibility for maintaining electronic documentation and aeronautical data and information.

The aircraft list considers the changes against a number of pre-determined parameters such as the type of aircraft, types of flight, departure and destination points, routes and timings of the flight, and other factors of operational significance, including the time the information becomes current for use and the time at which the information expires and is no longer valid for use. The filtering step 83 also uses the aircraft master document list 84 held in the ground-based system. This master document list holds a record of all documents and data and information held on the aircraft-based system for all aircraft 11 within the service provides contract.

The changes, including the addition of new documents, are determined in a step 85 and if there are no changes affecting a particular aircraft 11, the process terminates in 85a. If the changes affect a particular aircraft 11, the database 86 in the ground-based system is amended. In a compilation step 87, an amendment package 88 is prepared by the ground-based system, which in a communications step 89 is provided to the aircraft-based system 11. The communications step 89 can be either via secure Bluetooth communications or via a USB device. The data and information and documents on the aircraft-based system are updated in step 90 and the aircraft master document list updated in step 91 to reflect the changed content on the aircraft-based system. In a synchronisation step 92, the master document list on the aircraft-based system is synchronised with the master document list held on the ground-based system.

In a further subsequent step, the flight crew are able to advise the ground-based system of any errors or omissions or other corrections required in an error correction and reporting step 93.

An example of the embodiment is a change to a route manual. A route manual is a composition of documents and maps and charts, which a flight crew use during flight in connection with the operation of an aircraft 11. The route manual is subject to review and update each 28 days in accordance with a published schedule of pre-determined dates known as the Aeronautical Information Regulation and Control or AIRAC Cycle, and is a schedule published by the International Civil Aviation Organisation (ICAO). The purpose of the AIRAC Cycle is to provide a regularised date on which aeronautical information publication documents are updated worldwide. Aeronautical Information Publication or AlP documents are published by each country (a State) that is a contracting State to the Chicago Convention on International Civil Aviation. Publication of the AIRAC Cycle dates allows data compilers such as those publishing route manuals or other data for the flight management systems onboard an aircraft 11 to be properly planned and distributed to ensure any changes are made known to airline operators in advance of the date that the changes come into effect.

In this embodiment, a State changes the way a departure track is to be flown when departing from a particular runway at a particular aerodrome. This change is made firstly in the AlP of the country. Companies providing route manuals monitor changes made by States and, if the aerodrome is one that is included in a route manual that they produce, introduce a change to the contents of the route manual. The change to the route manual is the first step in the process shown in FIG. 4 at the collection and compilation step 81, after the changes have been received from data and information sources 80. In this case, the only change required to the route manual is to one departure chart for one aerodrome. The filtering processes at 82 and the aircraft list 83 show that there are several aircraft 11 which fly to that aerodrome and who will require the changed chart 85. The ground-based system amends the database 86 with the change in relation to those aircraft 11 requiring the change and prepares the chart to be sent to the aircraft 11 in step 87 in the form of a document amendment package 88, which identifies which aircraft 11 are to receive the changes. The data amendment package is also created in recognition of the date/time that the changes will take place and only sends the amendment package to the aircraft 11 when the change is imminent. In the step 89, the document amendment package is transported to the aircraft 11 either electronically via a USB device or via a Bluetooth communications connection 13. The aircraft-based system accepts (or rejects) the data amendment package after the data package has been delivered to the aircraft-based system and updates the aircraft documents. The aircraft-based system then determines from the date of the amendment when the change is due to become effective and the time when the change is not longer valid (the temporality of the data) to become current and makes the changed document available to the flight crew at the correct time. The aircraft-based master document list is updated in step 91 and synchronised with the ground-based system in step 92.

A similar example of the update and synchronisation process is in the form of electronic data, which is used to update the moving map display in the cockpit display terminals 62 and 63. The process flow is the same as for a route manual chart however, in this case for a data-driven display, a document is not provided in the update process, but the data that represents the changes are provided to the aircraft-based system. This updating process is used in connection with data objects resident in a geo-referenced moving map display, such as in conjunction with the display of weather features against a geographical background.

In all cases, the data or document flow is protected during transit and storage to ensure that the integrity of the data or documents is unchanged thus meeting specific international standards for the protection of aeronautical data and information while in transit or storage. This protection process is in place to ensure that the data being provided to the aircraft-based system is not altered in any way during the transmission. If the aircraft-based system detects that the data has been corrupted or changed by reference to the encryption algorithm, the data change is rejected by the aircraft-based system.

In a further example, an operational flight plan (OFP) and a flight crew briefing package (FCBP) are created by an onboard application within the aircraft-based system 71 on the aircraft 11, using the cockpit display unit 62 and 63 and the associated user interfaces. The flight planning application draws on data and information passed to it as part of a mission data sub-set, including weather information and NOTAM to create an OFP and the FCBP. The mission data sub-set is created from a main database located in the main data assembly area. Data and information contained in the main data is taken from the external data sources which is made up of data and information contained in NOTAM, weather data, navigation data, and other operational data such as slot times from a flow management unit, or track definition messages, and from data and information provided by the airline such as crew information, information regarding the schedule of flights and the timetable for these flights to take place, data and information from engineering and maintenance, and other information required and useful for the conduct of a flight.

After the OFP and FCBP have been created, the outputs are provided to the flight crew via the cockpit display units 62 and 63, and sent to the ground-based system 70 via the data and information processing and synchronisation device 76 and the aircraft-based communications device 75 to the ground-based communications device 73, which in turn passes the data and information to the data and information processing and synchronisation device in the ground-based system 70 and to those external agencies 69 requiring the information, including transmission via the AFTN and ATN communications links to air traffic control and other agencies requiring the information.

The data and information processing and synchronisation device updates the flight profile of the aircraft's operation with regard to the timing of the flight and the information that is contained in the FCBP as part of the content inventory management processes. When new or amended NOTAM or weather information is received by the ground-based system 70 from data providers 74, or from other external agencies 69, the new or amended data and information is analysed and compared with that held and being used by the various flights under the operational watch.

Data and information received by the ground-based system from data providers 74 or external agencies 69 is in a first step analysed by the ground-based system in terms of checks of reasonableness, completeness and accuracy and in a second step analysed in relation to the aircraft list 83 which is a listing of all aircraft 11 under operational surveillance by the service provider or the airline. The aircraft list considers the changes against a number of pre-determined parameters such as the type of aircraft, type of flight, departure and destination points, the route of the flight, the timing that the flight will take place, and the time that the data and information becomes current and the time that the data and information ceases to be current, for example a weather forecast or a NOTAM for a specific time period. This analysis step is one normally made by within an airline back office or other organisation providing a flight following service. If a change to the data or information held on an aircraft 11 is considered likely to affect the continuing operations of a flight 85, the new or changed data or information is passed to the aircraft 11 using the ground-based communications device 73 to the aircraft-based communications device 75 and so on to the cockpit display unit 62 and 63.

Only that information required by a specific flight is sent to the aircraft 11 that is concerned, and at a time when the information is required. The ground-based system provides information to the aircraft-based system based on the temporality of the information. This part of the updating and synchronisation process is accomplished using the secure communications and encryption tools in the ground-based and aircraft-based systems. When data or information is considered as being required by a flight, the ground-based system applies the public keys of the aircraft 11 to the data and information update package.

The aircraft list 83 contains a listing of the particular address of each aircraft 11 including the Bluetooth communications address and the IMEI of the airborne system if the communications for an airborne update are to be sent via satellite communications connections 31 and 32 from an aircraft 11 to satellite 27. When the data and information arrives at the aircraft 11, the aircraft-based system applies the private key held by the aircraft-based system to decrypt the data and information and permit the entry of the data and information into the aircraft-based system. Use of the encryption private key held on the aircraft 11 means that only information of interest to a specific flight could be read by the aircraft-based system.

The flight crew usually make en route report's to air traffic services providers and to their operating company to provide updates of the progress of the flight, which includes the present position of the aircraft 11, fuel remaining, and in some cases an airborne weather report. The flight crew use applications 36 in the aircraft-based system 34, the cockpit display units 63 and 64, and appropriate pilot interfaces such as the keypad on the touch-screen of the cockpit display units, or the separate keyboard to construct an en route report based on information extracted from other aircraft-based systems. After construction of an en route report, the flight crew transmit the report from the aircraft-based system 71 to the ground-based system 70 using the data and information processing and synchronisation device 76, the aircraft-based communications device 75 to the ground-based communications device 73, to the data and information processing and synchronisation device 72 and to external agencies 69.

If an airline has a need for additional reports, the aircraft-based system uses the onboard communications capability and applications to generate automatic en route reports to the ground-based system for the purposes of flight following or operational monitoring of the flight. Onboard applications in an aircraft 11 construct reports at pre-determined parameter times describing the geographical location of the aircraft 11 as coordinate values. These values are transmitted from the aircraft 11 using communications connections 31 to satellite 27 and from the satellite to the service provider's data centre 33 via communications connection 32. These coordinate values are used to plot the progress of the flight from departure point to destination.

The data and information processing and synchronisation device updates the progress of the flight in the ground-based system 70 which analyses the position of the aircraft 11 and correlates this positional information with other data and information received from data providers 74 or other external agencies so as to ensure the latest information is available to that part of the ground-based system 70 providing operational surveillance and information updating to the flight.

After the analysis has been completed, updates are sent back to the aircraft 11 on an as required basis, using the process described earlier and via the satellite communications connections 31 and 32 from an aircraft 11 to satellite 27 if these are required based on the information received through the in-flight reports, such as an amended time of arrival, or a change to the route of the flight made en route to divert around weather or on the basis of an air traffic control instruction.

All communications between the aircraft-based and ground-based systems are encrypted using public key infrastructure (PKI) or other suitable encryption methods to prevent unauthorised access to exchanges between an aircraft 11 and the ground. In addition to this, all communications are logged into the service provider's data centre to provide a full record of all transmissions between the ground-based system and the aircraft-based system. Message logging includes logging at a packet level, used when a message is broken down into a number of constituent parts before transmission. In this case, if a message M is sent as five packets, named as P1, P2, P3, P4, and P5, a relationship is formed directly between the message M and all of its corresponding packets P1-P5. In a further example of secure messaging, the receiving system (whether this is the aircraft-based or ground-based system) records the sequence of the messages being received by it such as M1, M2, M3 etc. If a message is received out of sequence, for example, the aircraft-based system receives messages M1, M2, M3 then M5, the messaging application in the aircraft-based system analyses the sequence and determines that M4 is missing. The aircraft-based system sends a request to the ground-based system for M4 to ensure the continuity and completeness of messaging between the aircraft-based and ground-based systems.

Communications between the ground-based system and the aircraft-based system use a meta-language to reduce the size of messages and consequently bandwidth requirements for the transmission of data between the two systems.

FIGS. 5 and 6 show message generation, encryption and sending at a ground station and at an aircraft 11, respectively.

In a retrieving step 200, the ground-based system 31 identifies the data and information forming part of a mission data subset 52 which is held on an aircraft-based system 34, and, in a correlation step 201, correlates the mission data subset 52 with the new data and information being received by the ground-based system from data sources coming from data proeiders 200. The ground-based system 31 holds a list of all aircraft 11 which are being monitored to ensure they are in receipt of up-to-date data. In a matching step 202, when there is a difference between the data and information held on the ground-based system 31 and the data and information held on an aircraft-based system, in a filtering step 203, the ground-based system identifies through a process of intelligent selection using pre-determined parameters such as type of aircraft, time of flight, route of flight, destination, and present position, data and information which is required by an aircraft-based system. The data may, for example, be given in the form of a NOTAM and weather update. In a decision step 204, it is decided which part of the data is sent to the aircraft 11.

In a sequence of steps 205 to 210, a part of the data which is to be encrypted is converted into an encrypted data set. In a compilation step 205, the part of the data which is to be encrypted is compiled into a plain data set, which is also known as a clear text. In a signing step 206, the data required for delivery to an aircraft-based system is digitally signed using encryption software on the ground-based system as a means of authenticating the point of origin of the data and information. In a compilation step 207, the plain data set is combined with the signature into a digitally signed data set. In a message encryption step 208, the digitally signed data is encrypted with a session key 208 which produces an encrypted data set. In a key encryption step 209, the session key is encrypted using a public key of the recipient in a process which produces a cipher text and an encrypted session key in a compilation step 210.

For multiple recipients, the session key is encrypted separately with each public key of a recipient, which results in n different encrypted versions of a session key if there are n different public keys of recipients. In a more general sense, the public key of the recipient serves as a recipient related encryption key. In one embodiment, the recipient refated encryption key is realized as public key which is generated according to a RSA algorithm, preferentially of key length 1024 bit or even 2048 bit. In an alternative embodiment the recipient related encryption key is realized as a shared secret which is generated according to a DiffieHellman algorithm.

The session key is realized as a symmetric key which is a shared secret of the sender and the intended recipient. The shared key may be formed according to a known cryptographic standard such as the data encryption standard (DES), triple DES or advanced encryption standard (AES) or others, such as IDEA, Cast or Blowfish. In the case of AES, the Rijndael algorithm is used. The Rijndael algorithm encrypts blocks having the length of multiples of 32 bits with keys having the length of multiples of 32 bits. The length of the blocks and of the keys lies between 128 bits and 256 bits and, in the case of AES, a block size of 128 bits and key sizes of 128, 192 or 256 bits are used.

In a second sequence of steps 211 to 215, which is conducted in parallel to the first sequence of steps 205 to 210, a part of the message which is to be sent as plain text is converted into a signed data set. In a compilation step 211, a plain data set is compiled. In a hash generation step 212, the plain data set is further secured using a cryptographic one-way hash function using encryption software in the ground-based system which is a process of taking a message of any length and producing a fixed output in a step 213 which is known as a message digest. For example, an SHA-2 type, SHA-1, MD4 or MD5 algorithm may be used as a one-way hash function in the hash generation step 212. The use of a one-way hash function ensures that the integrity of the message is preserved as any change the message will produce a different message digest. In a simpler alternative, a cyclic redundancy check, such as CRC-32, Bluetooth-CRC and the like, is used.

In a digest creation step 213, the hash value is used to create a message digest. In a signing step 214, the messaged is signed with the private key of the sender. In a compilation step 215, the encryption system uses the message digest and a private key to create plain text and a signature.

In an address retrieval step 216, the specific communications addresses of the aircraft-based systems are determined by the ground-based system 31 from a list of aircraft data that relate to the aircraft 11, which is held in a database in the ground-based system. In a processing step 217, the data and information for delivery to one or more aircraft 11 is passed to a data and information processing and synchronisation device located in the ground-based system, which in a sending step 218 passes the data and information to a ground-based communications device for transmission to an aircraft-based system on one or more aircraft 11. In a transmission step 219 the data is transmitted using secure communications connections, which may be either a satellite communications connection or a secure Bluetooth connection depending on the location of the aircraft 11, and whether the aircraft 11 is on the ground or in the air.

In a receiving step 220, the data is received by a communications device which maybe on one or more aircraft 11, depending on how many aircraft 11 were addressed in the message. In a processing step 221 the data is passed to a data and information processing and synchronisation device which reassembles the data packets. In a key decryption step 222, the session key is decrypted using a private key held on the aircraft-based system. In a decryption attempt of a message decryption step 223, at least a portion of the cipher text is decrypted using the session key. In a decision step, the decrypted portion of the cipher text is examined to determine if the decryption attempt was successful. The examination of the decrypted portion of the ciphertext may comprise parsing of the decrypted portion and searching for predetermined key words, addresses, such as e-mail addresses, for MAC-identifiers or other identification codes, or for standard headers.

If, in the decision step, it is decided that the decryption attempt was not successful, the message is discarded. If it is decided that the decryption attempt was successful, the remaining part of the cipher text is decrypted with the session key which has been decrypted in the key decryption step 222 and reproduces the signed text.

In a verification step 224, a software application located in the aircraft-based system examines the incoming message and recomputes the message digest to verify the integrity of the message content and the signature appended to the message.

In an alternative embodiment, the decryption attempt comprises a checking of a message digest or of a checksum to determine, if the decryption attempt was successful. In this alternative embodiment, the verification step 224 may be omitted.

Furthermore, in the verification step 224, software applications on the aircraft-based system examine the text that has been signed in the signing step 206 or the signing step 214 to determine the veracity of the signature appended to the message. In a decision step 225, if the signature is valid, the message is accepted into the system and processed further in a processing step 226. If the signature is not valid, the message is rejected by the aircraft-based system in a rejection step 227.

Use of the encryption systems described in this section means that one message can be sent to multiple recipients at the same time, while preserving the integrity of the data being transmitted between the ground-based system and aircraft-based systems, and ensures delivery to the correct aircraft-based system. In the case of multiple recipients, the session key is separately encrypted with the public key of each recipient and is included into the first data packet of the message.

The resulting message structure for n recipients is then as follows:

| asymmetrically encrypted session key for recipient 1 |
|---|
| . |
| . |
| asymmetrically encrypted session key for recipient n |
| symmetrically encrypted data, signature and hash value |

In an alternative embodiment, a recipient information is included in clear text. The recipient information may be given as a bit mask which indicates the addressed aircrafts 11, as described below. The use of the recipient information speeds up the decoding. An unsuccessful decryption attempt is not needed as the recipients are extracted from the recipient information.

For a typical key length of the session key of 128 bit, the size of the unencrypted key section becomes n times 128 bit. If, in step 209, the session key is encrypted with an RSA key of length 2048 bit, the size of the encrypted key section becomes up to n times 2048 bit which is about 2 kBytes for eight recipients.

The message is broken down into data packets which have the length of data packets of a short burst data (SBD) service, which is currently about 2 kBytes. Therefore, in the case of eight recipients using eight different 2048 Bit RSA keys, the length of the key segment of a message is about the same as the length of a short burst data packet.

FIG. 6 shows encryption and decryption of a message originated onboard an aircraft 11. In a data retrieval step 300 and a message creation step 301, a message is created using onboard applications 36 in an aircraft system 34. In compilation step 302, a plain data set of the message is provided for encryption. In a signing step 303, the plain data that is associated with the message is signed using encryption software application with a private key. In a compilation step 304, the signature is combined with the plain data to obtain a signed text. In an encryption step 305, the signed text is encrypted with a session key. The session key is encrypted using the onboard encryption software with a public key in a key encryption step 306. The signed session key and the encrypted data is compiled results into an output message, in a compilation step 307.

In a process which comprises steps 308, 309, 310, 311 and which is executed in parallel to steps 302, 303, 304, 305, 306, 307, a part of the message which is to be sent unencrypted, is processed. In a retrieval step 308, the plain data, which is not to be encrypted, is extracted from the message. In a hash generation step 309, a hash function applied to the plain data by the encryption software. The result is appended to the plain data as a message digest in a compilation step 310. In a signing step 310, the message digest is encrypted with a private key. In a compilation step 312, the signed message digest is combined with the plain data to obtain an output which comprises plain text together with a signed digest.

After the encryption process onboard the aircraft 11 has been completed, in a processing step 313, the message is passed to a data and information processing and synchronisation device onboard the aircraft 11, which in turn, in a transmission step 314, passes the message to an aircraft-based communications device for transmission to the ground-based system. In a receiving step 315, the ground-based system receives the message via an antenna. The aircraft-based communication device on board an aircraft 11 may use a first communications connection 13 to connect to secure Bluetooth communications connection at an airport 35 and 36, which in turn connects to a ground-based communications device in a service provider data centre 32 using communications connections 14 and 38. Alternatively, depending on the position of the aircraft 11 and if the aircraft 11 is in flight, the aircraft-based communications device onboard an aircraft 11 may use a second communications connection 31 which connects t ca satellite 27 and uses a next communications connection 32 between a satellite and the service providers data centre 33. The communications connections 32 between a satellite 27 and the data centre may be routed through immediate relay points on the ground, which are not show in the diagram.

When an encrypted message is received at the service provider data centre 33 via a ground-based communications device, in a processing step 316, the message is passed to a data and information processing and synchronisation device, where, in a key decryption step 317, the session key contained in the message is decrypted using a private key held in the ground-based key which has been obtained in a previous step.

In a decryption attempt of a message decryption step 318, at least a portion of the ciphertext is decrypted using the session key. In a decision step, the decrypted portion of the cipher text is examined to determine if the decryption attempt was successful.

If, in the decision step, it is decided that the decryption attempt was not successful, the message is discarded. If it is decided that the decryption attempt was successful, the remaining part of the cipher text is decrypted with the session key which has been decrypted in the key decryption step 222 and reproduces the signed text.

In a verification step 319, a software application located in the aircraft-based system examines the incoming message and recomputes the message digest to verify the integrity of the message content and the signature appended to the message.

In an alternative embodiment, the decryption attempt comprises a checking of a message digest or of a checksum to determine, if the decryption attempt was successful. In this alternative embodiment, the verification step 319 may be omitted.

If the signature is verified as being authentic in a decision step 320, the message is accepted for processing and distributed to the recipients of the message in a step 321. If the signature is not authenticated in step 320, the message is rejected in a rejection step 322.

Encryption and Decryption methods of further embodiments are described below.

FIG. 7 shows a second embodiment in which the use of multiple key segments is avoided by using an identity based encryption (IBE) for the encryption of the session key. According to the IBE scheme, a private key generator 350 generates a set of n private keys 351 for n aircrafts 11 to be addressed from a master key 352 and n aircraft identifiers 353. The private keys 351 are distributed to the n aircrafts 11. The master key 352, which comprises a master private key 354 and a master public key 355 is distributed to the ground-based system. The ground-based system uses the master public key 355 to encrypt the session key and includes the encrypted session key in a single key segment. A recipients identifier, such as a bit mask, is included into the message. The aircraft-based system extracts the recipients identifier from the received message. In a key decryption step, the aircraft based system uses the previously distributed private key from the key generator and the recipients identifier to decrypt the session key. (The use of only one key segment according to the identity based encryption scheme is advantageous in view of the limited size of a short burst data packet.) In an alternative to this embodiment, the private key generator 350 derives a group public key from aircraft identifiers 353 of a group of aircrafts 11 and from the master key 352 and uses the group public key to encrypt the session key.

In a third embodiment, a combination ID is assigned to each possible combination of n aircrafts 11, for example a n-bit Bitmask. In this embodiment, encryption of the message is done by using the specific id as encryption key. The encryption is then achieved by partitioning the message into blocks and XOR-ing the message blocks with the combination ID which, for n data blocks, results in the following message structure:

---
combination ID
Block 1 XOR (combination ID)
.
.
.
Block n XOR (combination ID)
---

Further segments and/or clear text may be provided as well. To enhance the security of this simple algorithm, the combination ID may be used as a key seed to generate an encryption key according to a process, which is known to the ground-based system and to the aircraft-based system. Furthermore, the Bits or the letters of the clear text may be scrambled according to a process, which is known to the ground-based system and to the aircraft-based system. The combination ID is appended to the encrypted message. To enhance the security, the scrambling process may be carried out after appending the combination ID.

According to the third embodiment, a recipient can identify if a broadcast message for multiple recipients is intended for the recipient by inspecting the combination ID and discard the message without a decryption attempt. Furthermore, the length of the encrypted message is small, which is especially advantageous in the context of short burst data packets. Moreover, the XOR-ing and the scrambling can be done fast and even with limited computational resources.

FIG. 8 shows a fourth embodiment for message encryption. In a first key generation step, a computing facility on the ground reads in a bit mask which indicates the addressed aircrafts 11. The bit mask is, for example, formatted as follows:

| Aircraft | 1 | 2 | 3 | ... | n |
|---|---|---|---|---|---|
| bit | 1 | 0 | 1 | ... | 0 | wherein the bit position corresponds to the aircraft number and the bit indicates whether the current message is intended for the aircraft 11. In a selection step, the bit mask is used to select a shared key 360 from a list of shared keys which is known to both the ground station and to the aircrafts 11 to be addressed. In a first key generation step, a random initialization vector IV is appended to the selected shared key to obtain a key seed. In a second key generation step, a key generation unit 362 generates an encryption key from the key seed according to a RC4 algorithm.

In a partitioning step, a clear text message is partitioned into data blocks 363, such that each data blocks fits within the length of a short burst data packet. In an integrity checking step, an integrity check value 364 is appended to a data block to be encrypted. In an encryption step, an arithmetic processing unit 365 XOrs the data block, which comprises the integrity check value, with the encryption key to obtain a ciphertext 366. In a compilation step, the random initialization vector IV 361 and the bit mask are appended to the encrypted message to form an aircraft related message 367. In a transmission step, the aircraft related message 367 is transmitted to aircrafts 11.

The security level of an encryption method according to FIG. 8 is comparable to that of wired equivalent privacy (WEP) encryption, whilst the length of the encrypted message is short and the encryption method is computationally simple.

The abovementioned embodiments are especially advantageous in connection with broadcast messages to multiple aircrafts. There are several types of broadcast. A first broadcast type comprises a pull broadcast in which aircraft send an information request message to a ground station for receiving the broadcast message, such as in an Iridium SBS service. Another broadcast type comprises a directed broadcast in which broadcast messages are sent into regions which depend on forecast aircraft positions. A further broadcast type comprises an undirected broadcast in which a broadcast message is transmitted over at least the satellites of a satellite network which are along the flight route of the addressed aircraft.

REFERENCE NUMERALS 10 flight information system
11 aircraft
13 Bluetooth communication channel
14 data network
27 satellite
33 service provider's data centre
34 operations support centre
35 airport
36 airport
38 first secure connection
39 airline communication channel
40 airline offices
41 second secure connection
42 second data network
50 external data source
51 external data source
52 main data assembly area
53 Mission data subset via secure communications
54 main database
56 airline data
57 aircraft data amendment package
59 onboard master documents
60 content inventory
61 content inventory
62 display unit
63 display unit
70 ground-based system
71 aircraft-based system
72 information processing and synchronization unit
73 ground-based communications devices
74 data providers
75 aircraft-based communications devices
76 data information processing and synchronization device
80 data and information sources
81 documents and amendments
82 data filter
83 aircraft list
84 aircraft master document list
85 changes
86 Database amendments
87 Preparation phase
88 Document amendment package
89 transport phase
90 document update
91 aircraft MDL update
92 aircraft and ground system MDL synchronisation
93 Error and correction reporting
200 retrieving step
201 correlation step
202 matching step
203 filtering step
204 decision step
205 compilation step
206 signing step
207 compilation step
208 message encryption step
209 key encryption step
210 compilation step
211 compilation step
212 hash generation step
213 digest creation step
214 signing step
215 compilation step
216 address retrieval step
217 processing step
218 sending step
219 transmission step
220 receiving step
221 processing step
222 key decryption step
223 message decryption step
224 integrity checking step
225 decision step
226 processing step
227 rejection step
300 data retrieval step
301 message creation step
302 compilation step
303 signing step
304 compilation step
305 message encryption step
306 key encryption step
307 compilation step
308 retrieval step
309 hash generation step
310 digest creation step
311 signing step
312 compilation step
313 processing step
314 sending step
315 receiving step
316 processing step
317 key decryption step
318 message decryption step
319 verification step
320 decision step
321 processing step
322 rejection step
350 private key generator
351 aircraft private key
352 master key
353 aircraft ID
354 master private key
355 master public key
360 shared key
361 initialization vector
363 data block
364 integrity check value
365 arithmetic processing unit
367 aircraft related message

The invention claimed is:

1. A wireless receiver for receiving an aircraft related message for an aircraft from a ground based station via a communications device, wherein the aircraft related message comprises a data amendment package for updating a database, the wireless receiver comprising:
- a recipient computer system for receiving at least one encrypted data packet comprising the aircraft related message via a communications device, wherein the recipient computer system is operative to record a sequence of the received encrypted data packets, to analyze the sequence and to send a request if the recipient computer system determines that a data packet is missing, the recipient computer system comprising the database, the database comprising aircraft data, the aircraft data comprising weather reports and NOTAM;
- an inspection means for inspecting a combination identifier which is included in the at least one encrypted data packet;
- a detection means for detecting, based on the combination identifier, if the aircraft related message is addressed to the recipient computer system;
- a decryption means for decrypting, based on an output of the detection means, the at least one encrypted data packet with a decryption key to obtain a decrypted data message; and
- a processing means for processing an output of the decryption means, the processing means being operative to update the database using the output of the decryption means, wherein the communications device is located at an aircraft.

2. The wireless receiver according to claim 1, further comprising a means for deriving the decryption key from the combination identifier.

3. The wireless receiver according to claim 2, further comprising a means for XOR-ing at least part of the encrypted data packet with the decryption key to obtain a decrypted data block.

4. An aircraft comprising the wireless receiver according to claim 1.

* * * * *